Dec. 1, 1936.  J. C. WELLS  2,062,342
OPHTHALMIC MOUNTING
Filed July 12, 1933
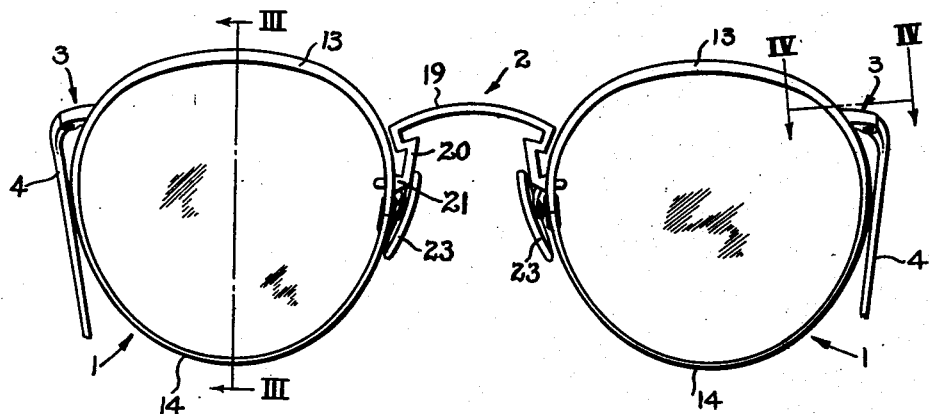
FIG. I.
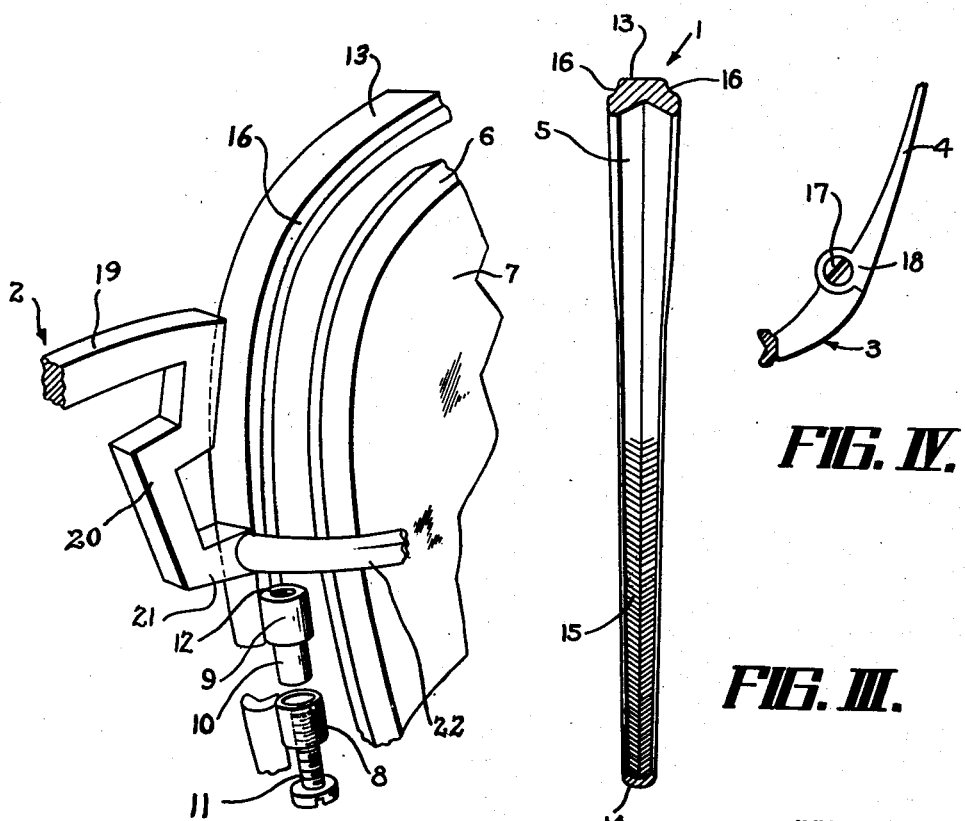
FIG. II.   FIG. III.   FIG. IV.
INVENTOR
Joel C. Wells.
BY Harry H. Styll
ATTORNEY Patented Dec. 1, 1936

2,062,342

UNITED STATES PATENT OFFICE 2,062,342

OPHTHALMIC MOUNTING

Joel Cheney Wells, Southbridge, Mass., assignor to American Optical Company, Southbridge, Mass., a voluntary association of Massachusetts Application July 12, 1933, Serial No. 680,058

4 Claims. (Cl. 88—47)

This invention relates to ophthalmic mountings and has particular reference to an improved lens supporting frame and method of making the same.

One of the principal objects of the invention is to reduce those portions of a frame type mounting which lie within the useful field of vision to a degree wherein they will be substantially invisible and unobstructive to the vision of the wearer and to provide a novel method of making the same.

Another object of the invention is to provide an ophthalmic mounting having continuously grooved peripheral lens holding rims which, above the useful field of vision, are relatively large in cross section to provide rigid supports between the bridge member and temple connections of the mounting, and within the useful field of vision are relatively small in cross section so as to be substantially invisible and yet of such a nature as to provide means in combination with the upper rigid portions to securely hold the lenses in the mounting and to eliminate substantially all strain on the lenses.

Another object is to provide an ophthalmic mounting having the desired reduced weight and clear vision features of a rimless type mounting, with the undesired surface defacing and lens weakening connections of such mountings removed.

Another object is to provide means for eliminating glare from the lens holding rims, particularly from the internal surfaces of the lower portions of said rims.

Another object is to provide simple, efficient, and economical means of supporting the lenses wherein the main supporting portions of the mounting will be above the useful field of vision.

Other objects and advantages of the invention will become apparent from the following description taken in connection with the accompanying drawing, and it will be apparent that many changes may be made in the details of construction, arrangement of parts, and steps of the process shown and described without departing from the spirit of the invention as expressed in the accompanying claims. I, therefore, do not wish to be limited to the exact details and steps of the process shown and described as the preferred forms only have been shown by way of illustration.

Referring to the drawing:

Fig. I is a front elevation of the ophthalmic mounting embodying the invention;

Fig. II is an enlarged fragmentary perspective view of the split portion of a lens holding rim showing the means for connecting the split ends thereof;

Fig. III is an enlarged sectional view taken on line III—III of Fig. I; and

Fig. IV is an enlarged sectional view taken on line IV—IV of Fig. I.

It is quite commonly recognized that the lens retaining rims of a frame type of ophthalmic mounting relieve substantially all strain on the lenses and are perhaps the most efficient means of supporting ophthalmic lenses before the eyes of the wearer. They obviate weakening the lenses by forming connecting openings or grooves therein, such as are necessary in rimless type mountings, and also obviate the use of lens straps or other connecting means which not only overlie the surfaces of the lenses and hinder vision in the vicinity thereof, but cause substantially all the strain to be on the lenses during use of the mounting.

Although the rims of mountings of the frame type have been very efficient as to eliminating strain and breakage of lenses, they, in the past, have had certain defects that have caused a curtailment of their use; notable among these defects were: the fact that such mountings were very noticeable on the face, a tendency to obstruct vision in the vicinity of the margins of the lenses, and a tendency to reflect annoying light rays into the eyes of the wearer.

It, therefore, is one of the primary objects of this invention to obviate the above defects by forming a frame type of ophthalmic mounting which will rigidly support the lenses in their prescribed relation before the eyes with practically no strain on the lenses, which will have its rims lying within the useful field of vision reduced to a degree wherein they will be practically invisible and unobstructive to the vision of the wearer, and which will obviate the annoying light reflections and other undesirable defects of the prior art.

Referring more particularly to the drawing wherein like characters of reference designate like parts throughout the several views, the device embodying the invention comprises broadly a pair of split lens rims 1, connected by a bridge member 2, and having on their temporal sides and above the useful field of vision the supports 3 for the temples 4. Each rim 1 is provided internally thereof with a continuous grooved or beveled surface 5 adapted to receive the beveled edge 6 of the lens 7. This groove or beveled surface 5 is adapted to hold the lens 7 in the rim when the split ends thereof are united. The rims 1, as shown in Fig. I, are provided on one end of their split ends with a tubular member 8 and on the opposite end with a tubular member 9 by means of which the ends are connected. The tubular member 9 has a reduced projection 10 which fits in telescoped relation with the tubular member 8 and is held therein by a screw 11 which is threadedly connected within the threaded bore 12 of the portion 10. The splits in the rims 1, as shown in Fig. I, are formed preferably on the nasal sides of the rims but it is apparent that the said splits may be formed at any desired location on the rims. It is also apparent that although applicant has shown and described tubular rim connecting means employing a screw member for uniting the split ends, the said split ends may be united by any suitable connecting means. Attention is directed to the fact that the tubular members 8 and 9 are secured to the rear of the lens rims 1 and are of such size as to be practically invisible when the mounting is on the face.

Each rim 1, as shown in Figs. I and III, is provided with an upper relatively rigid portion 13 which is shaped to the contour shape of the upper peripheral edge of the lens 7 and is provided with a lower relatively thin and practically invisible portion 14 which is shaped to the lower peripheral edge of the lens. The portions 13 and 14 at the sides of the lenses are shaped to blend with each other and to fit the peripheral edges of the lenses at said sides. The portions 13, which normally are located above the useful field of vision and at such a position as to be unobstructive to the vision of the wearer, are formed relatively large in cross section to provide relatively rigid main supporting means between the bridge member 2 and the temple connections 3 and are adapted to carry the weight of the lenses and maintain their desired aligned relation with each other during the use of the mounting.

The portions 14 which lie within the useful field of vision and which in the past have been very annoying to the vision of the wearer, have been reduced to such an extent that they will be practically invisible, but sufficiently strong to support the lenses in the mounting. These portions 14 are relatively ductile and pliable and merely function as cradle supports for engaging the lower peripheral edges of the lenses to secure them to the rigid main supporting portions 13. The annoying reflections of the prior art are eliminated from said lower portions by knurling or roughening the beveled surfaces 5, as illustrated at 15, or by painting, etching, or otherwise treating the said lower portions with any suitable means which will eliminate reflection. If desired, the entire inner beveled surfaces 6 may be treated as stated above.

The upper relatively large portions 13, as shown in Fig. III, are provided with grooved edges 16 which are adapted to reduce their outer reflective surfaces and cause them to appear much thinner than they actually are. This result is brought about by reducing the width of the edge and peripheral surfaces of said portions.

The temple supports 3 are normally positioned above the useful field of vision and are secured either to the peripheral face or rear of the rims 1, as desired, by soldering or other means, and extend rearwardly of the rims to a temple hinge connection 17. The main body portion of each support 3 tapers outwardly to the hinge connection 17 and is shaped to receive the hinged end 18 of the temple 4. The angle at which the temple support 3 on each side extends rearwardly of the vertical plane of the lens rim is such that the said support 3 will be practically invisible when the mounting is viewed at a position substantially between a side view and a straight ahead view, the said angle being substantially 45 degrees.

The bridge 2 is provided with a central arch portion 19 and Z shaped depending side portions 20 each having a foot 21 secured to the opposed rims 1 by soldering or other suitable means. The foot 21 has secured thereto, by solder or like means, a rearwardly extending guard arm 22 to which the nose pads 23 may be rigidly or loosely attached, as desired.

Attention is directed to the fact that the grooved edges 16 extend only throughout the upper portions 13 and are terminated at the tapered sides of the rims wherein they blend with said tapered portions and disappear.

The rims 1 may be formed from solid precious metal, filled metal, plated metal, imitation shell or other material suitable for the purpose. If metal is used it is preferably in the form of wire stock which during the process of forming the rims, is reduced from the round wire stock to a shape having a large portion forming the section 13 and a reduced portion forming the section 14 and is cut into bars of the required lengths to form rims of the desired sizes.

The process of forming a rim from the shaped bar stock is as follows:

A shaped bar member is placed in a confined die having the required shape to simultaneously produce the finished shape of the relatively rigid portion 13 and the lower thin portion 14, and is struck by a plunger die which presses the bar in the confined die. The plunger die is shaped to comatingly fit with the confined die and is provided with an edge portion which, during the compressing of the shaped bar member in said confined die, is adapted to form the internal groove or beveled surface 5 of the rim. This groove-forming portion of the plunger die may also, if desired, be provided with means for forming the knurled or roughened surface 15 of the rim. If desired the confined die may be provided with means for forming the grooved edges 16 or any desired design on the face of the rim.

After the bar has been shaped as set forth above it is removed from the confined die and bent to the shape of the lens rim, with the ends of the bar abutting each other. These abutting ends form the split ends of the rims referred to above and are provided with the tubular connecting means 8 and 9 to unite the said ends, as described above. After the rims have been properly shaped the bridge member 2 and temple supports 3 are attached thereto by soldering or other means, as previously stated, it being understood that the various parts are held in predetermined relation with each other prior to their being united, and that in some instances slight adjustment may be necessary to alter the relation of the parts and to fit the same to the wearer.

Although applicant has shown and described rims of only one particular shape it is apparent that rims having applicant's improved features may be formed to any shape desired. It is also apparent that any suitable type of bridge may be used.

From the foregoing description it will be seen that I have provided simple, efficient, and economical means and methods of accomplishing all of the objects and advantages of the invention.

Having described my invention, I claim:

1. In an ophthalmic mounting a pair of lens rims, said rims being divided and having means adjacent the ends for securing the ends together, said rims being thicker at the top than at the bottom and a portion of the internal side of said rims having a corrugated surface forming means for reducing light reflections, a bridge member connecting the rims on the nasal sides thereof, and temple connections on the temporal sides thereof.

2. A support for an ophthalmic lens comprising a frame member having a relatively thick portion shaped to fit the upper peripheral edge of the lens and a relatively thin portion shaped to fit the lower peripheral edge of the lens, said portions being shaped to blend with each other at the sides of the lens and having means on a portion of the lens contacting portion thereof for eliminating reflections.

3. A support for an ophthalmic lens comprising a frame member having a portion relatively large in cross section and a portion relatively small in cross section, said portions being shaped to blend with each other at the sides and having a continuous groove on the lens engaging faces thereof and means on a portion of the lens engaging face of one of said portions adapted to lie between the edge of the lens and the internal face of the groove for eliminating reflection.

4. In an ophthalmic mounting, a pair of lens rims, a bridge connecting said rims and temple connections on the temporal sides thereof, the upper portions of said rims between said bridge and said temple connections being relatively rigid and thick in the direction of the plane of the lens and transversely thereof in order to form a strong, rigid support against bending in directions transversely of the plane of the lens, said rims tapering down to a portion relatively thin in the direction of the plane of the lens and transversely thereof, a continuous groove on the inner side of each of said rims throughout the upper relatively thick and lower relatively thin portions to engage the peripheral edge of a lens, said thin portion serving as a tension member between the points of connection of said bridge and said temples which, acting against the periphery of the lens, serves to hold said upper rigid portions from bending away from the edge of the lens, said thick and thin portions being integral and unitary on one side of said lens and being separated and provided with meeting ends on the other side thereof and separable connecting means associated with said meeting ends for securing the said ends together, the separation of each rim being in the portion thereof below the bridge and temple connections so as not to sever and affect the rigidity of the upper relatively thick supporting portions of the rims.

JOEL CHENEY WELLS.